United States Patent [19]

Cohen et al.

[11] 4,413,342
[45] Nov. 1, 1983

[54] METHOD AND APPARATUS FOR FREQUENCY DOUBLING A LASER BEAM

[75] Inventors: Martin G. Cohen, Huntington; Kuo-ching Liu, East Setauket, both of N.Y.

[73] Assignee: Quantronix Corporation, Smithtown, N.Y.

[21] Appl. No.: 208,511

[22] Filed: Nov. 20, 1980

[51] Int. Cl.³ .............................................. H01S 3/10
[52] U.S. Cl. ........................................ 372/22; 372/21; 372/27; 372/98
[58] Field of Search ................... 372/22, 20, 116, 98, 372/21, 27

[56] References Cited

U.S. PATENT DOCUMENTS 3,975,693  8/1976  Barry et al. ........................... 372/22
4,127,827  11/1978  Barry ................................... 372/22

*Primary Examiner*—James W. Davie
*Assistant Examiner*—Léon Scott, Jr.
*Attorney, Agent, or Firm*—Kane, Dalsimer, Kane, Sullivan and Kurucz

[57] ABSTRACT

A method and apparatus for providing coincident orthogonally-polarized laser beams having twice the frequency of a fundamental frequency emitted by a laser source is disclosed. A second harmonic generator within a laser resonator cavity causes frequency-doubled laser beams to travel in opposite directions along an axis thereon. One of the beams undergoes a polarization change of substantially 90° and is returned for travel along the laser axis in the same direction as a second frequency-doubled beam which has not undergone a polarization change. The orthogonally-polarized beams are then emitted through an output mirror designed for transmitting beams of twice the frequency of the fundamental beam.

10 Claims, 1 Drawing Figure

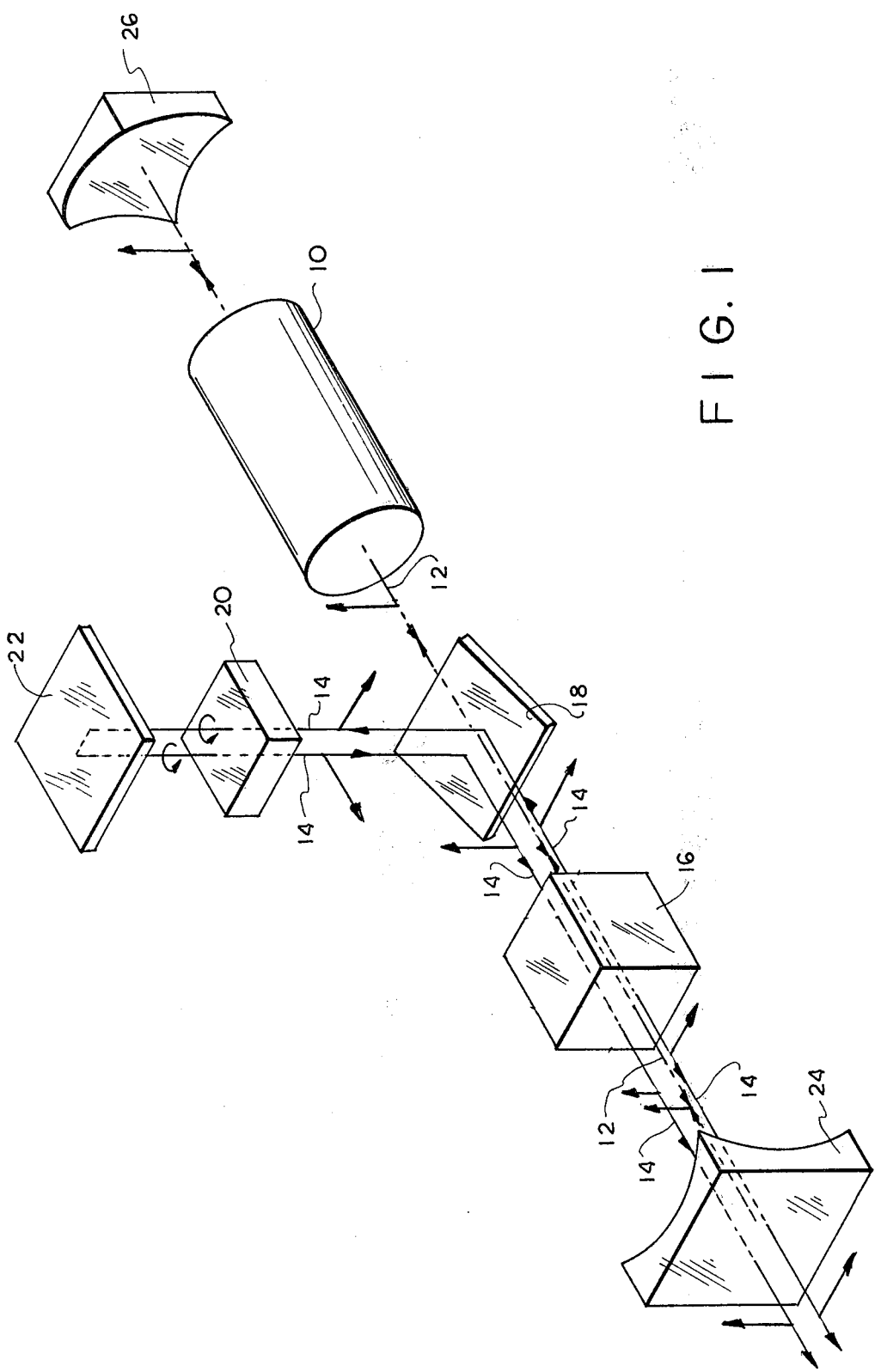

4,413,342

METHOD AND APPARATUS FOR FREQUENCY DOUBLING A LASER BEAM

BACKGROUND OF THE INVENTION

The field of the invention concerns a frequency-doubled laser, and in particular a method and apparatus for providing two harmonic beams which are colinear, overlapping and orthogonally polarized with respect to each other.

A laser's output may be frequency-doubled by placing a non-linear crystal external to or internally within the laser resonator cavity. Since the fundamental frequency power available within the cavity is much higher than the power coupled out, the intracavity configuration is much more efficient in generating second harmonic power than the extracavity arrangement.

However, there are shortcomings in utilizing the intracavity configuration. Conventional cavity designs use either only one harmonic beam or use a configuration with a third mirror to combine the two harmonic beams. The first design is of low efficiency due to the fact that it uses only one half of the harmonic power available. The second design suffers from poor stability and reduced efficiency due to the possible interference effect of the two combined harmonic beams.

SUMMARY OF THE INVENTION

It is a principal object of the invention to overcome the disadvantages of the system discussed above.

It is another object of the invention to provide an apparatus which makes use of the second harmonic frequency of the beam emitted by a laser.

The system includes a laser active medium, means for generating the second harmonic frequency of the fundamental frequency emitted by the laser active medium, a dichroic Brewster angle polarizing plate for transmitting the fundamental frequency emitted by the laser active medium and reflecting the second harmonic frequency thereof, means for changing the polarization of the beam reflected by the dichroic Brewster plate, a highly reflecting mirror at the second harmonic, and an output dichroic mirror for transmitting the second harmonic frequency and reflecting the fundamental frequency. A rear mirror highly-reflecting the fundamental frequency is provided behind the laser active medium to complete the resonator cavity.

In the application of the invention described herein, a second harmonic generator is utilized for doubling the fundamental frequency of the laser source. A quarter wave plate is employed in combination with a highly-reflecting mirror for changing the polarization of the second harmonic beam reflected by the dichroic Brewster plate. The arrangement of the elements is such that coincident beams are emitted through the output mirror, each of said beams having twice the fundamental frequency. The emitted beams are orthogonally polarized with respect to each other so that interference effects which could degrade the efficiency of harmonic generation are completely eliminated.

The drawing is a schematic of the components utilized for providing orthogonally polarized coincident harmonic beams.

DETAILED DESCRIPTION OF THE INVENTION

The apparatus used for practicing the invention is shown schematically in the drawing. The various beams are shown as separated from one another for purposes of clarity. It will be appreciated, however, that the parallel beams are in fact coincident.

A laser active medium 10 is provided for emitting a beam 12 having a desired fundamental frequency. In this particular embodiment of the invention, a YAG laser is utilized for emitting a beam having a wavelength of 1064 nanometers. This wavelength is in the infrared range. The system employed herein provides a beam 14 having a wavelength of 532 nm.

A second harmonic generator 16, which is a non-linear crystal, is positioned within the laser resonator cavity in the path of the beam 12 from the laser source. The crystal may, for example, be made from potassium titanyl phosphate. A dichroic Brewster plate 18 is positioned between the laser source 10 and the crystal 16 to insure the fundamental frequency polarization. The dichroic Brewster plate 18 is designed to transmit substantially 100% of the p-polarized 1064 nm beam and to reflect substantially 100% of a 532 nm beam in arbitrary polarization, either p or s.

A quarter wave plate 20 at the second harmonic frequency is positioned above the dichroic dielectric mirror 18 in the path of the light reflected therefrom. The plate 20 has its optic axis oriented at 45° to the polarization of the harmonic beam. A mirror 22 is provided to reflect the beam 14 passing through the quarter wave plate 20 back through the quarter wave plate to the Brewster plate 18. The mirror 22 and quarter wave plate 20 may actually be superimposed.

An output mirror 24 is positioned at the front end of the apparatus to transmit all light having a 532 nm wavelength and reflect all beams of 1064 nm wavelength. A rear mirror 26 is provided at the opposite end of the apparatus which is designed for 100% reflection of the 1064 nm wavelength.

In operation, the YAG laser emits a beam 12 having a wavelength of 1064 nm. The beam passes through the Brewster plate and a fraction of it is frequency-doubled by the non-linear crystal. A second frequency doubled beam is generated along the laser axis in the opposite direction by the 1064 nm beam reflected by the output mirror. As will be noted from the drawing, an arrow perpendicular to beam 12 or 14 indicates the polarization of the particular beam. Two coincident beams 14 are transmitted by the output mirror and are orthogonally polarized with respect to each other. This effect is achieved by utilizing the above described dichroic Brewster plate 18, quarter wave plate 20, and mirror 22 discussed above. The 532 nm beam which is reflected by the dichroic Brewster plate passes back and forth through the quarter wave plate due to the orientation of Brewster plate 18, and the mirror 22. A 90° polarization rotation accordingly occurs. This reflected 532 nm beam cannot interfere with the 532 nm beam being generated by the 1064 nm beam propagating towards the output mirror because it is polarized 90° with respect to this 532 nm beam. In this manner, the interference and subsequent instability and power loss at 532 nm are avoided.

The invention accordingly provides a stable and highly efficient means for frequency-doubling a laser beam. It will be appreciated that other equivalent means may be used for practicing the invention without departing from the spirit thereof. Obviously, the technique disclosed herein may be applied to the frequency doubling of other fundamental wavelengths. The scope of the invention should accordingly be determined by reference to the appended claims.

What is claimed is:

1. An apparatus for frequency doubling a laser beam within a laser resonator cavity and providing an output including coincident second harmonic beams of different polarization, comprising:
   a laser generating a laser beam of fundamental frequency;
   means for doubling the fundamental frequency of said beam from said laser by generating frequency doubled beams which travel in opposite directions along a common axis away from said doubling means;
   reflecting means positioned between said laser and said means for doubling the fundamental frequency capable of reflecting one of the frequency doubled beams and transmitting said beam of fundamental frequency;
   means for rotating the polarization of the frequency doubled beam reflected by said reflecting means;
   means for returning the rotated beam so that it travels along the common axis; and
   an output mirror capable of reflecting a beam of the fundamental frequency and transmitting beams of the second harmonic of said fundamental frequency.

2. An apparatus as described in claim 1 wherein said means for changing polarization is capable of providing a 90° polarization rotation.

3. An apparatus as described in claim 1 further comprising a rear mirror capable of reflecting a beam of the fundamental frequency, said rear mirror, laser, reflecting means, means for doubling the fundamental frequency, and said output mirror being positioned, respectively, along the common axis, whereby said rear mirror and said output mirror define a resonator cavity.

4. An apparatus as described in claim 3 wherein said means for returning the beam having a rotated polarization includes a return mirror, a quarter wave plate being positioned between said reflecting means and said return mirror.

5. An apparatus as described in claim 1 wherein said means for doubling the fundamental frequency includes a non-linear crystal.

6. An apparatus as described in claim 1 wherein said laser source is designed to emit a beam having a wavelength of about 1064 nm.

7. An apparatus as described in claim 1 wherein said reflecting means is a dichroic Brewster plate.

8. An apparatus as described in claim 1 further including a rear mirror, said laser source being positioned between said reflecting means and said rear mirror, said rear mirror designed to reflect the fundamental frequency.

9. A method for providing two coincident frequency doubled laser beams of differing polarization from a laser beam of a given fundamental frequency, comprising the steps of:
   providing a laser, said laser emitting a beam of fundamental frequency within a resonator cavity defined by an output mirror capable of reflecting the fundamental frequency and transmitting the second harmonic frequency thereof and a rear mirror which is highly reflective of the fundamental frequency;
   causing the generation of the second harmonic of said fundamental frequency such that first and second frequecy doubled beams travel in opposite directions along a laser axis within said resonator cavity;
   reflecting one of said frequency doubled beams away from said laser axis;
   rotating the polarization of said reflected frequency doubled beam by substantially 90° with respect to the other; and
   causing said frequency doubled beams of rotated polarization and said other frequency doubled beam to travel in a coincident path through said output mirror.

10. A method as described in claim 9 wherein the polarization of one of said frequency doubled beams is rotated by passing it twice through a quarter wave plate.

* * * * *